United States Patent
Andonov

(10) Patent No.: US 8,602,721 B2
(45) Date of Patent: Dec. 10, 2013

(54) METHOD OF OPERATING TURBOCHARGED PISTON ENGINE

(75) Inventor: Branimir Andonov, Davie, FL (US)

(73) Assignee: Wartsila Finland Oy, Vaasa (FI)

( * ) Notice: Subject to any disclaimer, the term of this patent is extended or adjusted under 35 U.S.C. 154(b) by 862 days.

(21) Appl. No.: 12/629,626

(22) Filed: Dec. 2, 2009

(65) Prior Publication Data

US 2011/0129333 A1 Jun. 2, 2011

(51) Int. Cl.
*F01D 1/00* (2006.01)

(52) U.S. Cl.
USPC ...... 415/117; 123/1 A; 123/198 A; 123/25 G; 123/25 H

(58) Field of Classification Search
USPC ........... 123/198 A, 1 A, 25 G, 25 H; 415/117
See application file for complete search history.

(56) References Cited

U.S. PATENT DOCUMENTS

| | | | |
|---|---|---|---|
| 3,961,482 A * | 6/1976 | Jamaux | 60/619 |
| 4,059,123 A * | 11/1977 | Bartos et al. | 134/102.2 |
| 5,400,597 A * | 3/1995 | Mirabile | 60/606 |
| 5,944,483 A | 8/1999 | Beck et al. | |
| 6,901,759 B2 * | 6/2005 | Frutschi | 60/772 |
| 2002/0040581 A1 * | 4/2002 | Finger et al. | 60/607 |
| 2003/0017768 A1 * | 1/2003 | Gokan | 440/111 |
| 2008/0236150 A1 | 10/2008 | Jarvi | |
| 2009/0133718 A1 * | 5/2009 | Lebold et al. | 134/18 |
| 2009/0158733 A1 * | 6/2009 | Swenson et al. | 60/605.1 |

FOREIGN PATENT DOCUMENTS

| | | |
|---|---|---|
| EP | 1577520 A2 | 9/2005 |
| GB | 2459314 A | 10/2009 |
| WO | 2005049972 A1 | 6/2005 |

OTHER PUBLICATIONS

TPS Inc. (http://www.fluidproducts.com/atomizin.htm).*
International Search Report for corresponding PCT application No. PCT/FI2010/050978, mailed Mar. 16, 2011.

* cited by examiner

*Primary Examiner* — Thanh Truong
*Assistant Examiner* — Ruben Picon-Feliciano
(74) *Attorney, Agent, or Firm* — Heslin Rothenberg Farley & Mesiti P.C.

(57) ABSTRACT

Invention relates to method of operating turbocharged piston engine including the steps of running the engine during a period, shutting down the engine, and restarting the engine. After a first time interval from shutting down the engine, and while a turbine and compressor parts of the turbocharger are rotating, a cleaning agent is introduced into the stream of gas flowing in a flow channel upstream the turbine part during a second time interval prior to restarting the engine.

13 Claims, 3 Drawing Sheets

METHOD OF OPERATING TURBOCHARGED PISTON ENGINE

BACKGROUND OF THE INVENTION

1. Field of the Invention

Invention relates to turbocharged piston engines. More specifically invention relates to a method of operating turbocharged piston engine comprising the steps of running the engine during a period, shutting down the engine and restarting the engine.

2. Description of Related Art

In internal combustion engine technology turbochargers, in which the energy of the exhaust gas provides the power for running the compressor, are commonly used for increasing the efficiency of the engine operation. A turbo compressor comprises a compressor section, by which pressurized combustion air is introduced into the engine. In addition, the turbo compressor comprises a turbine section for driving the compressor. The exhaust gases coming from the engine are led to the turbine, which converts the energy of the exhaust gases into driving power for the compressor. Forming of crust, such as carbon deposit, has been noticed as a problem in connection with turbine part of turbo compressors. Forming of crust is especially problematic in the blades of the turbine and also clearance between the blades of the turbine and the turbine housing and especially when heavy fuel oil is used as a fuel in a turbocharged piston engine. The surface temperature of the surfaces limiting the gas rises to a high level and the crust forming on the surfaces is especially hard. The properties of the crust vary according to the composition of the fuel; with vanadium- and sodium-containing heavy fuel oils the problem is especially considerable.

In publication EP 1 577 520 A2 there is shown a turbo compressor arrangement in connection with a piston engine, which arrangement comprising a compressor unit and a turbine unit connected to each other, wherein the turbine unit comprises a turbine wheel having blades and a turbine housing enclosing the turbine wheel and the blades at a distance therefrom. There is a cooling space for a cooling medium arranged substantially adjacent the tips of the turbine blades for cooling the turbine housing and avoiding the forming of crust. This arrangement provides a cooling of a limited area of the turbine housing aiming to prevent the formation of the crust. However, the publication does not concern cleaning of already fouled turbine.

Several solutions have been developed for removing carbon deposits from the turbine surfaces, while the turbine remains in operation. Publication U.S. Pat. No. 5,944,483 A shows an apparatus for wet cleaning a nozzle ring of an exhaust-gas turbocharger turbine utilizing a so-called thermal shock method. The method for wet cleaning of the nozzle rings of exhaust-gas turbocharger turbines is based on thermal shock of the contaminants, and includes the steps of injecting water in repeated, relatively small amounts, into the exhaust duct immediately upstream of the nozzle ring. A delay between injections allows the nozzle ring to reheat to operating temperature so that each water injection causes a thermal shock. An apparatus to perform the method includes water injection nozzles installed in the exhaust gas casing and a control system. This method requires the engine to be running while the cleaning is performed. Additionally, using thermal shock for detaching the crust causes also extra stress and load to the structure of the turbocharger.

Other methods of removing carbon deposits from the turbine surfaces are continuous water injection at low load of engine. This takes place in unfavourable conditions, that is, conditions that itself cause most of the contamination. Dry cleaning using hard particles is also known.

US 2008236150 shows a piston engine provided with a turbo compressor which may be operated at a higher output during the cleaning of the turbine. This is accomplished by a method of operating a piston engine that comprises a turbo compressor including a compressor and an exhaust gas turbine coupled to drive the compressor, in which method exhaust gas is cooled by adding air and/or water to the exhaust gas upstream of the turbine while the cleansing agent is fed to the turbine.

WO 2005/049972 A1 discloses a cleaning device for the nozzle ring and the rotating blades of an axial turbine of a turbo compressor. The cleaning device comprises a rod-shaped nozzle protruding into the flow channel upstream the turbine. A cleaning medium is injected into the gas flow through the injection openings of the nozzle. It is also suggested that the nozzle may be advantageously attached to an extra waste gate flange which usually exists due to the fact that the flow channel is often provided with two opposite waste gate openings for facilitating waste gate installation on either side of the flow channel.

Cleaning the turbine during operation of the engine by injecting, for example, water into the exhaust gas stream upstream the turbine causes the detached crust to easily be entrained by the gases to the exhaust gas ducting and to the atmosphere which is not desired.

An aim of the invention is to produce a turbo compressor arrangement in connection with a piston engine by means of which the problems associated with prior art can be minimized.

DISCLOSURE OF THE INVENTION

Objects of the invention are met by method of operating turbocharged piston engine comprising the steps of running the engine during a period, shutting down the engine and restarting the engine, in which method after a first time interval from the shutting down of the engine, and while a turbine and compressor parts of the turbocharger are maintained rotating, cleaning agent is introduced into the stream of air flowing in a flow channel upstream the turbine part during a second time interval prior to restarting the engine. This way the cleaning agent is efficiently spread to the surfaces of the turbine part detaching the crust on the surfaces. Thus, the cleaning of the turbine part is efficient and service work is straightforward and may be performed during substantially short shut down period of an engine.

The starting of the engine is performed preferably substantially immediately after introduction of the cleaning agent so that the detached crust may not dry and attach back to the surfaces.

After shutting down of the engine, a flow path for ambient air into the flow channel may be increased leading additional air to the turbine part. This way the rotation of the turbine wheel may be maintained or at least assisted during the second time interval. The second time interval may also be called as cleaning stage.

According to an embodiment of the invention, the flow path for ambient air into the flow channel may be increased by opening a by-pass channel connecting the pressure side of the compressor part and the pressure side of the turbine part of the turbocharger.

According to another embodiment of the invention the flow path for ambient air into the flow channel may be increased by opening a valve which connects the pressure side of the turbine part of the turbocharger directly to the ambient air.

Advantageously the cleaning agent may be water mist. Water mist wets efficiently the surfaces of the turbine part and detaches the crust. The water may be sprayed into the stream of gas so that the droplet size is smaller than 1000 μm. Advantageously the water may be sprayed into the stream of gas so that the droplet size is smaller than 100 μm. The temperature of the water may be preferably about 20 degrees C.

According to an embodiment the water may be re-circulated in which case the temperature of the water increases due to warming up during the cleaning procedure.

Preferably the second time interval during which the surfaces of the turbine part are kept wet by supplying water mist is at least one hour.

According to an embodiment of the invention the rotation of turbine and compressor parts of the turbocharger may be initiated by means of an air start system of the engine. This may be accomplished by admitting start air into the cylinders of the engine from which the air flows through the turbine part assisting the rotation thereof.

A drain may be arranged in a flow channel downstream the turbine part and it is opened during the cleaning stage. The water not entrained by the air is collected through a drain.

A further embodiment of the invention is a method of operating a turbocharged piston engine comprising running the engine, shutting down the engine, and restarting the engine, wherein, after a first time interval from the shutting down the engine, and while a turbine and a compressor of the turbocharger are rotating, introducing a cleaning agent into a stream of air flowing in a flow channel upstream of the turbine for a second time interval. In one aspect, the method may further comprise introducing a flow of ambient air into the flow channel, for example, after shutting down of the engine. For instance, introducing the flow of ambient air into the flow channel may comprise opening a channel connecting a pressure side of the turbine of the turbocharger to ambient air. In one aspect, introducing the flow of ambient air into the flow channel may be practiced by opening a by-pass channel connecting a pressure side of the compressor and a pressure side of the turbine of the turbocharger.

In another aspect, the cleaning agent may comprise water, and the water may be sprayed into the stream of gas so that the water droplet size is substantially smaller than 1000 micrometers (μm), or substantially smaller than 100 μm.

The method is advantageously applied to a turbocharged piston engine in a marine vessel and the stream of gas is conveyed to the atmosphere through a funnel of the vessel assisting the rotation of the turbine and compressor parts of the turbocharger.

According to another embodiment, the turbocharged piston engine may be a turbocharged piston engine in a marine vessel, and wherein the method may further comprise discharging a stream of gas from the turbine to the atmosphere through a funnel of the vessel. In one aspect, the method may further comprise assisting rotation of the turbine and compressor of the turbocharger by providing a draft effect with the funnel of the vessel.

Invention has several advantages. Firstly, it provides a safe method of cleaning the turbo compressor since the engine is stopped. Aspects of the invention, may cause only minimal thermals stress on turbine components—the engine typically has been gradually cooled down for 1-2 hours prior to cleaning stage. Turbocharger performance is kept optimal through the whole period between cleaning according to aspects of the invention. By applying aspects of the present invention, turbine part components, including nozzle rings, diffusers and turbine wheel, will remain in optimal condition through the whole manufacturer defined lifetime.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
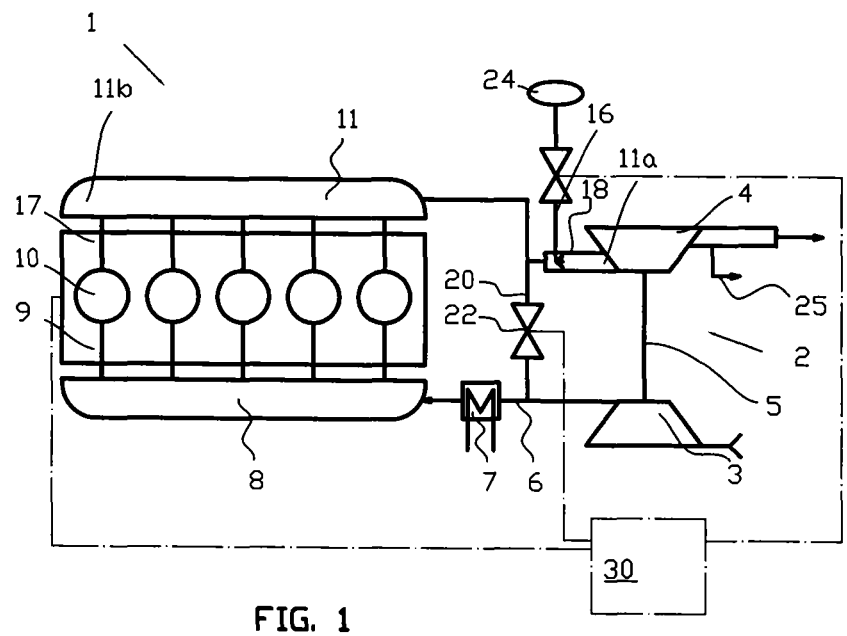
FIG. 1 illustrates an embodiment of the invention.

FIG. 1 shows a piston engine 1 provided with a turbo compressor 2. The turbo compressor 2 comprises a compressor or compressor part 3 and a turbine or turbine part 4, which are interconnected by means of a drive shaft 5. The drive shaft 5 is attached to the housing of the turbo compressor 2 via a bearing system (not shown). The task of the compressor 3 is to feed pressurized air to the engine 1 in order to provide pressurized combustion air for combustion of the fuel in the engine 1. The compressor part 3 comprises a rotatable rotor or wheel provided with blades for pressurizing the combustion air to be conveyed to the engine 1. A flow space, channel, or passage 6 is adapted, for example, positioned, on the high-pressure side of the compressor 3, between the compressor 3 and the combustion spaces of the engine cylinders 10 of engine 1. Flow space 6 is adapted for conveying pressurized air, that is, intake or combustion air, to the cylinders 10. The flow space 6 may include a heat exchanger 7 for cooling or heating the combustion air. In addition, the flow space 6 may include one or more charge air receivers 8, which is located after the heat exchanger 7 in the flow direction of the combustion air. The flow space 6 also comprises inlet channels 9 positioned between each cylinder 10 and the receiver 8 for conveying combustion air from the receiver 8 to the cylinders 10.

An exhaust gas duct 11 is arranged between the cylinders 10 and the high-pressure side of the turbine part 4 for conveying the exhaust gases of the engine to the turbine part 4. The first end 11a of the exhaust gas duct 11, that is, the end of duct 11 nearest turbine 4, is connected to the inlet of turbine part 4. The exhaust gas duct 11 may typically be located substantially parallel with the row of the cylinders 10. The second end 11b of the exhaust gas duct 11, that is, the end of duct 11 farthest away from the turbine 4, may extends to the vicinity of the cylinder farthest away from the turbine part 4. At least some of, but typically each of cylinder 10 is connected to the exhaust gas duct 11 by means of outlet channels or passages 17. The turbine or turbine part 4 of turbo compressor 2 comprises a rotor or a wheel provided with blades which are rotated by the exhaust gas coming from the engine 1. Moreover, the engine 1 may comprise a fuel-feed device (not shown) for supplying fuel to the cylinders 10.

According to the conventional art, while the engine 1 is running, combustion air is led to the compressor part 3, for example, from ambient air, where the air pressure is raised, for example, to a higher level than the ambient air pressure. The pressurized air is led to the flow space 6 on the high-pressure side of the compressor 3. In the flow space 6 combustion air may be conveyed to the heat exchanger 7 and cooled by the heat exchanger 7 typically to 40-100 degrees C. After the cooling, the combustion air is led to the charge air receiver 8. From the receiver 8 combustion air is led via the inlet channels 9 to the cylinders 10. Fuel, for instance, heavy fuel oil, is fed to the cylinders 10 and combusted in the presence of the combustion air in the combustion spaces of the cylinders 10 by a conventional ignition source, such as, by compression ignition. Exhaust gas generated by the combustion is conveyed from the cylinders 10 through the outlet channels 17 to the exhaust gas duct 11 and through the exhaust gas duct 11 to the turbine part 4. While passing through the turbine 4 the gas flow rotates the wheel of the turbine 4, the rotary motion of which is transmitted by the shaft 5 to the rotor of the compressor part 3.

According to one aspect of the invention, the turbine part 4 is provided with a feed device 16 for supplying cleaning agent to a flow channel or passage 18 leading to turbine part 4, for example, to the high pressure inlet of turbine part 4. In practise, the flow channel 18 may be part of the exhaust duct 11 of the engine 1, and thus both expressions "flow channel 18" and "exhaust duct 11" may be used in the following description of aspects of the invention. By means of the cleaning agent carbon deposits and/or other contaminants collected on the surfaces of the turbine 4 are removed as explained later. In one aspect, carbon deposit is removed especially from the surface of the nozzle ring (not shown) in the turbine part 4 and from the surface of the turbine housing around the rotor blades. The nozzle ring is provided with blades, which change the flow direction of the exhaust gas prior to flowing to the turbine wheel so that the flow of exhaust gas is suitable for the rotor blades and the flow velocity of the exhaust gas is increased.

The feed device 16 for the cleaning agent may comprises one or more nozzles or openings through which cleaning agent is injected into the flow channel 18 at a point upstream of the nozzle ring of the turbine part 4.

According to an embodiment of the invention, the feed device 16 may be connected to a source of pressurized water 24 and thus the cleaning agent may preferably be water. The source of pressurized water 24 may preferably comprise a source of low pressure water combined with a high pressure pump (not shown) feeding the water into the feed device 16.

The turbocharged piston engine 1 may further be provided with a by-pass channel, conduit, or passage 20. The by-pass channel 20 leads from the pressure side of the compressor part 3 to the pressure side of the turbine part 4 of the turbo charger 2 and may be provided with one or more a valves 22 in order to open and close the channel 20, as described later.

Now, according to an embodiment of the invention, the turbocharged piston engine 1 is operated so that firstly the engine 1 is run during a time period as needed. The engine 1 may typically be fuelled by heavy fuel oil and thus the exhaust gases from engine 1 to turbine 4 tend to be especially fouling. During the period of running the turbine part 4 may accumulate carbon deposits as crust on the turbine's surfaces. This crust should be removed in order to maintain the operation of the turbine part 4 at an adequate level of performance. The time period of running engine 1 may be as long as required and/or planned. After the running time period, the engine 1 is shut down. According to aspects of the invention, the shut down moment triggers a first time interval during which the turbine part 4 is allowed to cool down. Therefore, the first time interval may also be called a cooling down period. After the cooling down period has passed, cleaning agent is introduced into the stream of gas flowing in flow channel 18 upstream the turbine part 4. Preferably, the cleaning agent is water. In one aspect, the introduction of water is realized so that it is introduced into the stream of gas as water mist. The first time interval may be such that the turbine part 4 has cooled at least to a temperature at which the water mist does not substantially evaporate instantly from the surfaces of the turbine 4. In practise some amount of water may evaporate, but the effect is not comparable to the thermal shock method because the temperature of the surfaces has already cooled down to about 150 degrees C. or less. This also avoids excessive thermal shock which would be caused if water mist would be sprayed at operating conditions as such. The first time interval may be at least about 1 hour. Typically, the first time interval may be between about 1 and about 2 hours. The introduction of water mist may be continued during a second time interval during which the turbine part 4, particularly, in one aspect, the nozzle ring and the turbine wheel are kept wet by continuously or intermittently introducing water mist into the stream of gas flowing through the turbine part 4. The second time interval may preferably be at least about 1.5 hours, but in some cases the cleaning stage may be even about 2 hours, or more. After the cleaning stage, that the engine 1 may be restarted and the detached crust dislodged from surfaces of turbine 4 by aspects of the invention may be removed from the surfaces of the turbine part 4. In practise, the effect of the cleaning stage according to aspects of the invention, is may be mainly to loosen or detach the crust from the surfaces of turbine 4, the crust does not necessarily come off or be substantially removed from the surfaces during the cleaning step, but may be substantially removed by after the restarting the engine 1.

In one embodiment of the invention, in order to assist in maintaining and/or increasing the flow rate of the stream of gas flowing through the turbine part 4, a flow path for ambient air into the flow channel 18 may be provided which introduces additional air to the turbine part 4. For example, in one aspect, this may be important because it may be advantageous that during the introduction of the water mist the turbine wheel is maintained rotating and the increased flow rate may facilitate this rotation. In practise, the increasing the flow of water and/or air to turbine 4 may preferably be accomplished by opening valve 22 in the by-pass channel 20 connecting the high pressure side of the compressor part 3 and the high pressure side of the turbine part 4 of the turbocharger 2. The opening of valve 22 opens a substantially direct flow path from the compressor part 3 to turbine part 4 and by-passing the cylinders 10 of the engine 1.

In one aspect of the invention, a control unit 30 may be provided in connection with the engine 1 shown as in FIG. 1. The control unit 30 may be arranged to control at least the operation of the feed device 16 and the by-pass valve 22, so that once the engine is shut down, the control unit 30 controls the valve 22 in the by-pass channel 20 to open and provide additional air to the turbine part 4 and facilitates the cooling of the turbine part 4. After the first time interval (cooling) has passed, the control unit 30 may controls the feed device 16 to commence the introduction of the cleaning agent, for example, the water mist, into the stream of gas flowing in the flow channel 18. The duration of the first time interval may be stored into the control unit 30 and the control unit may keep the feed device 16 operating until the second time interval has elapsed. Then, the control unit 30 may deactivates the feed device 16, for example, by closing valve 22.

In one aspect, the water may be sprayed into the stream of gas so that the droplet size is smaller than 1000 μm. However, in another aspect, advantageously the water is sprayed into the stream of gas so that the droplet size is smaller than 100 μm.

According to an embodiment of the invention, the turbocharger 2 may be maintained rotating by means of an air start system of the engine. In this case, pressurized air stored in the air start system is admitted to the exhaust duct, preferably intermittently, which keeps the turbine part 4 and compressor part 3 of the turbocharger 2 rotating. The turbine part 4 of the turbo compressor 2 may be provided with a drain 25 so that an amount of water mist which is not entrained by the air is collected through the drain.

Figure 2:
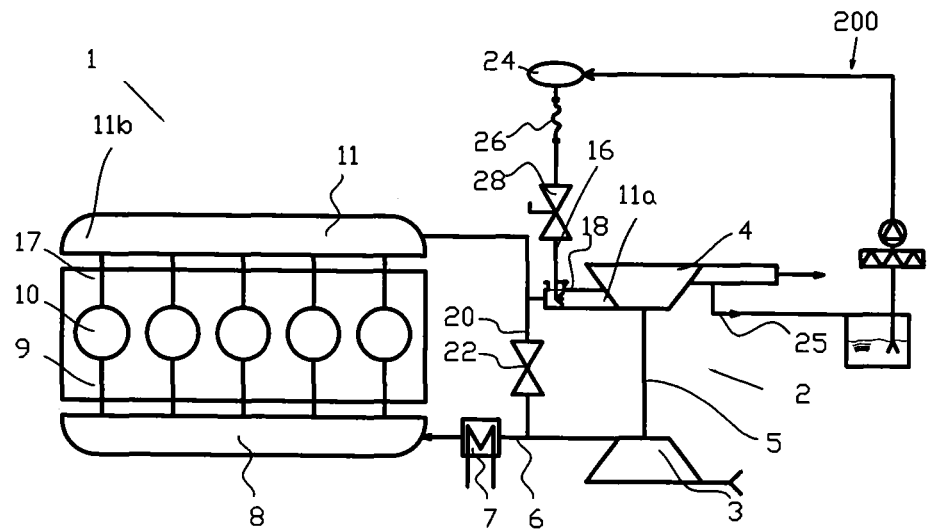
FIG. 2 illustrates another embodiment of the invention.

FIG. 2 shows another embodiment of the invention in which the method is practised manually. When the engine 1 has been shut down, the flow channel 18 leading to the turbine part 4 may be opened. In one aspect, it may be convenient to use a waste-gate branch outlet which typically exists in large engines, for example, those engines intended to be used as ship propulsion prime movers and auxiliary engines and having their cylinder diameter greater or equal to 200 mm and/or capable of producing power over 150 kW/cylinder. The feed device 16 may be removably attached, for example, mounted to the flange of the waste-gate branch outlet, so that its nozzle or spray openings are directed towards the nozzle ring of the turbine part 4. The feed device may be coupled with the source of pressurized water 24, for example, by means of a hose 26, as shown in FIG. 2. After the engine 1 has been cooled down during the first time interval, a valve 28 in the feed device 16 may be opened and the water from source 24 may be introduced into the stream of gas flowing in a flow channel 18, for example, as a mist. This may be practised during a second time interval prior to restarting the engine as described above.

In FIG. 2 there is also shown a further embodiment of the invention in which there is a cleaning agent recycling system 200 provided in connection with the engine 1. The cleaning agent, such as, water collected by the drain 25, may be led to the cleaning agent recycling system 200 which returns a usable fraction of the collected water back to the source of pressurized water 24. This way the amount of water used may be decreased. Waste material, for example, detached crust from the turbine part, may be separated from the water from drain 25 and at least portion of the water may be recirculated.

Figure 3:
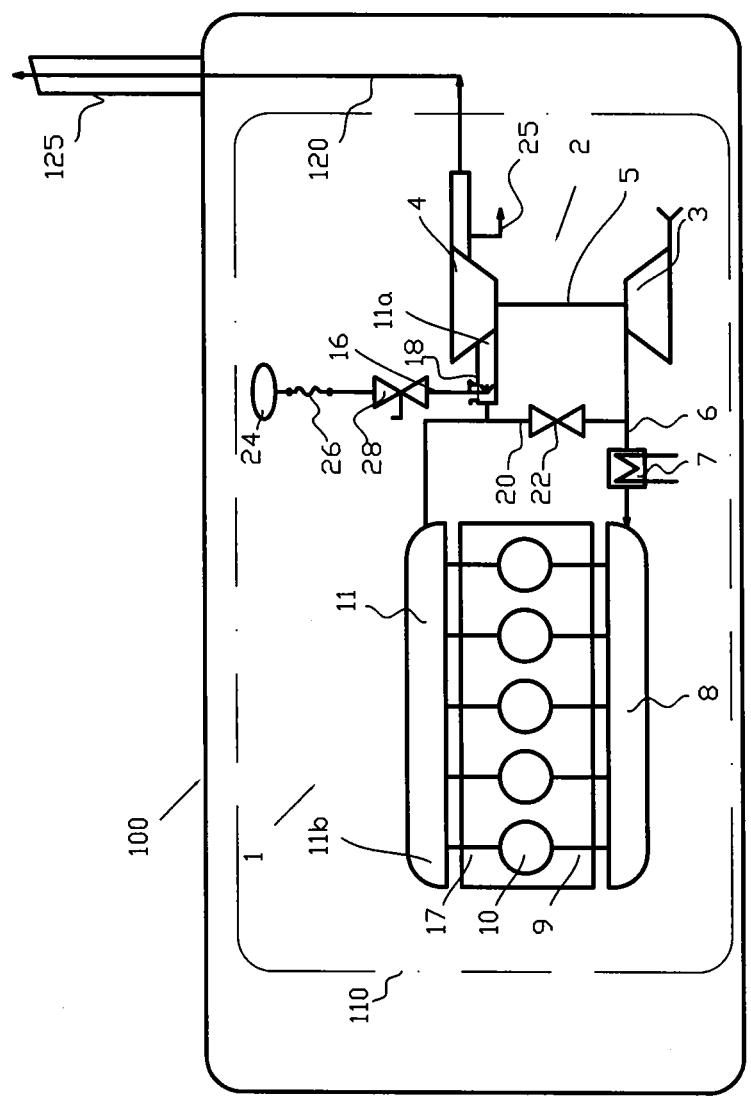
FIG. 3 illustrates a still another embodiment of the invention.

FIG. 3 shows another embodiment of the invention is which the method is practised in a piston engine arranged in a marine vessel 100. Marine vessel 100 is illustrated here schematically and marine vessel 100 may be, for example, a cruise vessel, ferry, or cargo ship. The engine 1 is arranged into an engine room 110 of the vessel 100 from which the exhaust gas duct 120 is led to a funnel 125 of the vessel 100. The engine 1 may be operated as is disclosed in connection with FIG. 1, but during the second time interval, that is, during the cleaning stage, the stream of gas may be conveyed to the atmosphere through a funnel 125 of the vessel 100 after assisting the rotation of the turbine 4 and compressor 3 parts of the turbocharger. Rotation of turbine wheel during the cleaning stage may be very beneficial. In order to enhance the rotation, the engine room air pressure may be maintained and/or controlled to be at 100-200 Pascals (Pa). Additionally, in one aspect, there may be a step of starting and/or maintaining the operation of a turbocharger lubrication pump in order to ensure the circulation of the lubrication oil.

In the embodiment of FIG. 3, the maintaining and/or increase of the flow rate of the stream of air flowing through the turbine part 4 may also be accomplished by increasing the flow path for ambient air into the flow channel 18 leading additional air to the turbine part 4. Here the height of the funnel 125 may facilitate the air flow by increasing draft effect of the flow channel 18.

In one aspect, the increase in air flow may be important because it may be advantageous that during the introduction of the water mist the turbine wheel is maintained rotating and the increased flow rate facilitates this action.

Figure 4:
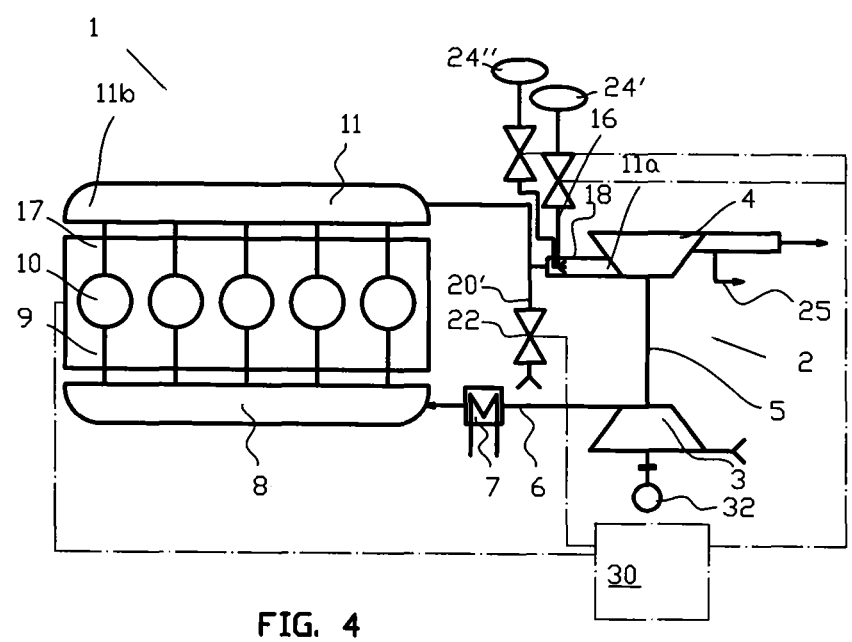
FIG. 4 illustrates a still another embodiment of the invention.

In FIG. 4 there is shown a still another embodiment of the invention. The embodiment shown in FIG. 4 corresponds to the embodiment of FIG. 1 with the following exceptions. The feed device 16 is connected to a source of low pressure water 24' and a source of high pressure air 24". Also in this case, the cleaning agent may be water. The source of pressurized air 24" and the source of low pressure water 24' may be connected to the feed device 16 so that water introduced through the feed device 16 is atomized by means of the pressurized air. This may be an advantageous embodiment for permanent installations because when the water is atomized by pressurized gas, the spraying openings in the feed device 16 may be larger, for example, larger than when the water is atomized by unpressurized gas. In this aspect, the feed device 16 may be less prone to clogging.

As shown in FIG. 4, the turbocharged piston engine 1 may be further provided with a branch channel 20'. The branch channel 20' leads from the ambient air to the pressure side of the turbine part 4 of the turbo charger 2 and may be provided with a valve 22 in order to open and close the channel 20'.

In FIG. 4 there is also shown an additional or alternative way of maintaining the turbocharger 2 rotating during the cleaning stage. Before commencing the cleaning stage, an electric motor 32 which is in connection with the turbocharger may be started and maintained operating during the cleaning stage. The motor 32 may be connected to the turbocharger permanently, that is, motor 32 may be a so-called power take-in (PTI) and/or power take-off (PTO) motor. The motor 32 may also be connected to the control unit 30 to be controlled by the unit. Alternatively the motor 32 may be coupled temporarily for the purpose.

As an example, an aspect of the invention was tested in a V-engine having 16 cylinders of 460 mm bore with excellent results. Cleaning of turbine part was carried out during the engine was shut down and appropriately cooled down. The source of pressured water used was a high pressure water system (up to 9 MPa). By-pass valve 22 was opened and during the washing stage the turbine part 4 was continuously rotating. About 600-700 liters (l) of water was drained from a turbine part during the cleaning stage (at a rate of about 5-6 l/min).

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A method of operating a turbocharged piston engine comprising:
    (a) running the engine;
    (b) then shutting down the engine;
    (c) while the engine is shut down and while a turbine and a compressor of a turbocharger are rotating, introducing a flow of ambient air into a flow channel upstream of the turbine by opening a channel connecting a pressure side of the turbine of the turbocharger to ambient air, and introducing a cleaning agent into a stream of air flowing in the flow channel upstream of the turbine;
    (d) then restarting the engine.

2. The method according to claim 1, wherein the method further comprises maintaining rotation of the turbine and compressor of the turbocharger by means of an electric motor.

3. The method according to claim 1, wherein introducing the flow of ambient air into the flow channel comprises opening a by-pass channel connecting a pressure side of the compressor and a pressure side of the turbine of the turbocharger.

4. The method according to claim 1, wherein the cleaning agent is water.

5. The method according to claim 4, wherein the water is sprayed into the stream of air so that the water droplet size is substantially smaller than 1000 μm.

6. The method according to claim 5, wherein introducing the water comprises spraying the water into the stream of air so that water droplet size is substantially smaller than 100 μm.

7. The method according claim 1, wherein the first time interval between shutting down t he engine and introducing a cleaning agent is at least one hour.

8. The method according to claim 1, wherein the method further comprises initiating rotation of the turbine and compressor of the turbocharger by means of an air start system of the engine.

9. The method according to claim 1, wherein the method further comprises draining a flow channel downstream of the turbine and collecting at least some cleaning agent drained from the turbine.

10. The method according to claim 9, wherein the method further comprises recirculating at least some of the collected cleaning agent.

11. The method according to claim 1, wherein the turbocharged piston engine comprises a turbocharged piston engine in a marine vessel, and wherein the method further comprises discharging a stream of gas from the turbine to the atmosphere through a funnel of the vessel.

12. The method according to claim 11, wherein the method further comprises assisting rotation of the turbine and compressor of the turbocharger by providing a draft effect with the funnel of the vessel.

13. The method according to claim 1 wherein the cleaning agent is water.

* * * * *

UNITED STATES PATENT AND TRADEMARK OFFICE
CERTIFICATE OF CORRECTION

| | | |
|---|---|---|
| PATENT NO. | : 8,602,721 B2 | |
| APPLICATION NO. | : 12/629626 | |
| DATED | : December 10, 2013 | |
| INVENTOR(S) | : Branimir Andonov | |

It is certified that error appears in the above-identified patent and that said Letters Patent is hereby corrected as shown below:

Title Page, below abstract, delete "13 Claims, 3 Drawing Sheets" and insert --12 Claims, 3 Drawing Sheets--.

In the Claims

Column 9, Line 13: Claim 7, Delete "t he" and insert --the--.

Column 10, Line 16: Claim 13, Delete "Claim 13 in its entirety".

Signed and Sealed this
Eleventh Day of November, 2014

Michelle K. Lee
*Deputy Director of the United States Patent and Trademark Office*